United States Patent
Cho et al.

(10) Patent No.: US 9,693,357 B2
(45) Date of Patent: Jun. 27, 2017

(54) METHOD AND APPARATUS FOR ALLOCATING RESOURCE

(71) Applicant: ELECTRONICS AND TELECOMMUNICATIONS RESEARCH INSTITUTE, Daejeon (KR)

(72) Inventors: Yunhee Cho, Daejeon (KR); Seok Seo, Daejeon (KR); Jae Su Song, Daejeon (KR); Seung-Hwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 224 days.

(21) Appl. No.: 14/258,099

(22) Filed: Apr. 22, 2014

(65) Prior Publication Data

US 2015/0063316 A1  Mar. 5, 2015

(30) Foreign Application Priority Data

Aug. 30, 2013  (KR) .................. 10-2013-0103988

(51) Int. Cl.
*H04W 72/08* (2009.01)
*H04W 72/04* (2009.01)
*H04W 16/04* (2009.01)

(52) U.S. Cl.
CPC ..... *H04W 72/082* (2013.01); *H04W 72/0486* (2013.01); *H04W 16/04* (2013.01)

(58) Field of Classification Search
CPC .................. H04W 72/082; H04W 72/0486
See application file for complete search history.

(56) References Cited

U.S. PATENT DOCUMENTS

| 8,804,649 B1* | 8/2014 | Guan .................... H04W 48/18 370/252 |
| 2009/0080499 A1* | 3/2009 | Yavuz ................. H04B 1/7107 375/144 |
| 2010/0027502 A1* | 2/2010 | Chen ..................... H04L 5/0007 370/330 |
| 2010/0151876 A1 | 6/2010 | Park et al. |
| 2011/0003553 A1* | 1/2011 | Kim .................... H04W 72/082 455/63.1 |
| 2011/0070911 A1 | 3/2011 | Zhang et al. |
| 2011/0077016 A1* | 3/2011 | Stolyar ............... H04W 52/244 455/450 |

(Continued)

OTHER PUBLICATIONS

Y. Cho et al., "Adaptive Fractional Time Reuse for Multi-cell OFDMA Networks", IEEE Communications Letters, Aug. 2013.

(Continued)

*Primary Examiner* — Pao Sinkantarakorn
*Assistant Examiner* — Kabir Jahangir
(74) *Attorney, Agent, or Firm* — Rabin & Berdo, P.C.

(57) ABSTRACT

In a cellular communication system including a plurality of cells, a resource allocation apparatus of a base station determines a resource division ratio of a present resource frame using a traffic load of a plurality of cells that are measured for an immediately preceding resource frame and marginal utility of each partition, divides a present resource frame into a plurality of partitions according to the determined resource division ratio, and allocates a plurality of partitions to a user.

17 Claims, 8 Drawing Sheets

(56) References Cited

U.S. PATENT DOCUMENTS

| | | | |
|---|---|---|---|
| 2011/0103365 A1 | 5/2011 | Sankaran et al. | |
| 2011/0261721 A1* | 10/2011 | Zhou | H04W 16/32 |
| | | | 370/254 |
| 2012/0071182 A1* | 3/2012 | Cho | H04W 16/02 |
| | | | 455/501 |
| 2012/0088517 A1* | 4/2012 | On | H04W 16/10 |
| | | | 455/452.1 |
| 2013/0028218 A1* | 1/2013 | Chun | H04L 5/0023 |
| | | | 370/329 |
| 2014/0295866 A1* | 10/2014 | Cho | H04L 5/003 |
| | | | 455/452.1 |
| 2015/0146557 A1* | 5/2015 | Pan | H04L 5/0051 |
| | | | 370/252 |

OTHER PUBLICATIONS

G. Li et al., "Downlink Radio Resource Allocation for Multi-cell OFDMA System", IEEE Trans. on Wireless Communications, vol. 5, No. 1, Dec. 2006.

\* cited by examiner (a) PI_0

(b) PI_1

(c) PI_2

(d) PI_3

METHOD AND APPARATUS FOR ALLOCATING RESOURCE

CROSS-REFERENCE TO RELATED APPLICATION

This application claims priority to and the benefit of Korean Patent Application No. 10-2013-0103988 filed in the Korean Intellectual Property Office on Aug. 30, 2013, the entire contents of which are incorporated herein by reference.

BACKGROUND OF THE INVENTION (a) Field of the Invention

The present invention relates to a method and apparatus for allocating a resource. More particularly, the present invention relates to a method and apparatus for allocating a resource that can adjust inter-cell interference in a wireless communication system including a plurality of cells.

(b) Description of the Related Art

In order to achieve a high network system capacity, a goal of a 4th generation mobile communication system is to use a frequency reuse 1 method. However, the frequency reuse 1 method becomes a factor that seriously deteriorates performance of a cell boundary user by increasing inter-cell interference (ICI). Furthermore, as the number of base stations per service area increases, a performance deterioration phenomenon of a cell boundary user becomes more serious. Therefore, in order to fully obtain a gain provided in a multi-cell orthogonal frequency-division multiple access (OFDMA) network environment and to provide the same user bodily sensation quality in a global network, effective ICI adjustment is essential.

In order to solve an ICI problem, several dynamic ICI adjustment methods have been researched, and particularly, have been researched based on coupling of power control and user scheduling, but such methods should be operated by a slot-by-slot method and thus generally require high signaling overhead.

Therefore, an ICI adjustment method through a fractional frequency reuse (FFR) technique has been in the spotlight as an actual embodiment method to improve spectral efficiency of a cell boundary user.

Similar to an FFR technique, a soft fractional time reuse (FTR) method using high transmitting power in different resource division between adjacent cells in a time resource area was suggested. FTR provides a high spectral efficiency gain in a low signal to interference-plus-noise ratio (SINR) (e.g., 0 dB or less) area. FFR or FTR methods focus on uniform distribution of traffic or users. Therefore, when inter-cell traffic distribution or user distribution is uniform, there is no problem, but when inter-cell traffic distribution or user distribution is not uniform, a cell having insufficient resources may exist and a cell in which resources remain may exist. Further, when load distributions of the cell center and the cell boundary are not uniform even within one cell, an allocated resource is not used or is insufficient and thus a case in which a service is not appropriately performed may occur. Therefore, in an FFR technique or an FTR technique, a method of optimally operating performance of an entire network according to user distribution and traffic load distribution is requested.

SUMMARY OF THE INVENTION

The present invention has been made in an effort to provide a method and apparatus for allocating a resource having advantages of optimally operating an entire network according to user distribution and traffic load distribution.

An exemplary embodiment of the present invention provides a method of allocating a resource in a resource allocation apparatus of a base station of a cellular communication system including a plurality of cells. The method includes: determining a resource division ratio of a present resource frame using a traffic load of a plurality of cells that are measured for an immediately preceding resource frame and marginal utility of each partition; dividing the present resource frame into a plurality of partitions according to the resource division ratio; and allocating the plurality of partitions to a user of a cell that the base station manages.

The method may further include performing intra-cell user scheduling at every time slot at each of the plurality of partitions.

The performing of intra-cell user scheduling may include determining a user to allocate to the present time slot using an average data rate of each user at an immediately preceding time slot and an achievable data rate of each user for a subchannel of the base station at a present time slot.

The determining of the user may include calculating each user's average data rate at the immediately preceding time slot using each user's average scheduling indicator at the immediately preceding time slot, and a user that is allocated to the immediately preceding time slot may have 1 as the average scheduling indicator and a user that is not allocated to the immediately preceding time slot may have 0 as the average scheduling indicator.

The determining of a resource division ratio may include: calculating marginal utility of each partition using an average data rate of each user for the immediately preceding resource frame; calculating a traffic load at the base station for the immediately preceding resource frame; and transmitting the traffic load that is calculated for the immediately preceding resource frame and marginal utility of the each partition to a coordinated base station (BS) of an adjacent cell.

The determining of a resource division ratio may further include receiving a traffic load that is calculated for the immediately preceding resource frame from the coordinated BS of the adjacent cell and marginal utility of each partition.

The plurality of partitions may be divided into a first partition and a plurality of second partitions, and the allocating the plurality of partitions to a user may include allocating the first partition to a user that is positioned at the center of the cell, and allocating one second partition of the plurality of second partitions to a user that is positioned at a boundary of the cell.

The allocating of one second partition may include setting transmitting power at the one second partition to a first level, and the allocating of the first partition may include setting transmitting power at the first partition to a second level lower than the first level.

The allocating the plurality of partitions to a user may further include allocating the remaining second partitions of the plurality of second partitions to a user that is positioned at a center of the cell.

The allocating of the remaining second partitions may include setting transmitting power at the remaining second partitions to a third level lower than the second level.

The resource may include a time or a frequency.

Another embodiment of the present invention provides a resource allocation apparatus of a base station that manages a first cell in a cellular communication system including a plurality of cells. The resource allocation apparatus includes a controller and a transmitter. The controller determines a resource division ratio of a present resource frame using resource division information according to a resource division ratio of an immediately preceding resource frame of the plurality of cells, divides the present resource frame into a plurality of partitions according to the determined resource division ratio, and performs intra-cell user scheduling at every time slot at the plurality of partitions. The transmitter transmits resource division information according to a resource division ratio of the immediately preceding resource frame and the present resource frame to an adjacent cell.

The resource allocation apparatus may further include a receiver. The receiver may receive resource division information of the immediately preceding resource frame from the adjacent cell.

The controller may calculate marginal utility and a traffic load of each partition using an average data rate of each user for the immediately preceding resource frame, and the resource division information may include marginal utility and the traffic load of each partition.

The controller may determine a user to allocate to the present time slot using an average data rate of each user at an immediately preceding time slot and an achievable data rate of each user of a subchannel of the base station at a present time slot.

The controller may calculate an average data rate of each user at the immediately preceding time slot using an average scheduling indicator of each user at the immediately preceding time slot, and an average scheduling indicator of each user may be 1 for a user that is allocated to the immediately preceding time slot and may be 0 for a user that is not allocated to the immediately preceding time slot.

The controller may divide the plurality of partitions into a first partition and a plurality of second partitions according to a resource division ratio of the present resource frame, the plurality of second partitions may be allocated to a user that is positioned at a boundary of a plurality of cells according to a cell type, and the first partition may be allocated to a user that is positioned at the center of the plurality of cells.

The controller may set transmitting power at an allocated second partition to a first level and set transmitting power at the first partition to a second level lower than the first level.

The remaining second partitions, except for an allocated second partition at a plurality of second partitions, may be allocated to a user that is positioned at the center of the first cell, and the controller may set transmitting power at the remaining second partitions to a third level lower than the second level.

DETAILED DESCRIPTION OF THE EMBODIMENTS

Figure 1:
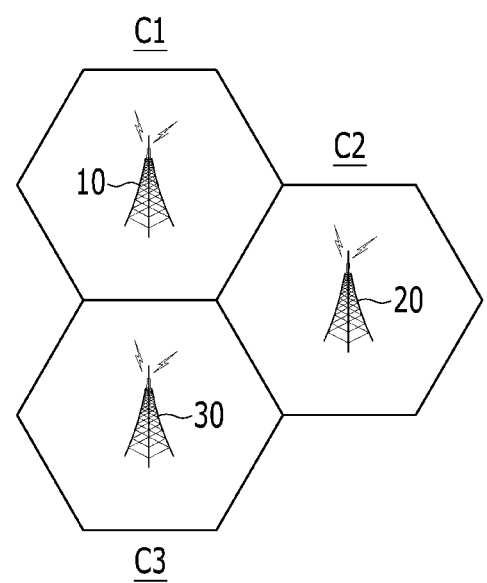
FIG. 1 is a diagram illustrating an example of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Hereinafter, a method and apparatus for allocating a dynamic resource according to an exemplary embodiment of the present invention will be described in detail with reference to the drawings.

FIG. 1 is a diagram illustrating an example of a wireless communication system according to an exemplary embodiment of the present invention.

Referring to FIG. 1, the wireless communication system includes a plurality of cells C1, C2, and C3. The cells C1, C2, and C3 include base stations 10, 20, and 30, respectively.

The base stations 10, 20, and 30 communicate with a user within the cells C1, C2, and C3 using a radio resource. Here, the user is a terminal.

In a wireless communication system having a plurality of cells C1, C2, and C3, a method of removing ICI includes a fractional frequency reuse (FFR) method and a fractional time reuse (FTR) method.

Figure 2:
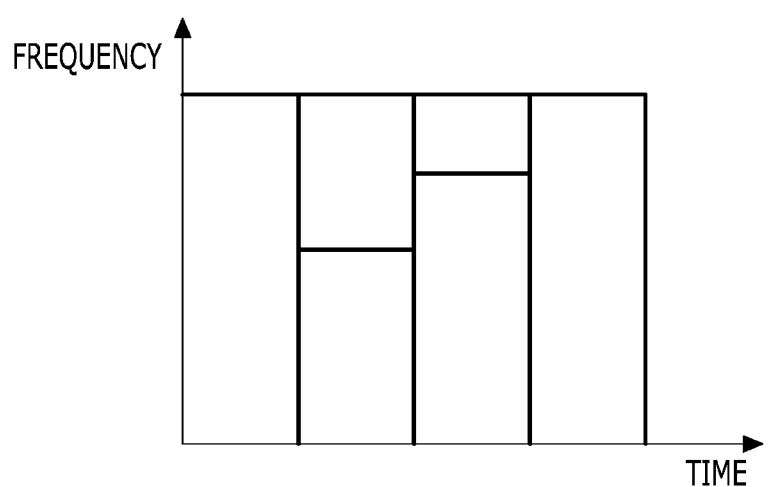
FIG. 2 is a graph illustrating a radio resource structure according to an exemplary embodiment of the present invention.

FIG. 2 is a graph illustrating a radio resource structure according to an exemplary embodiment of the present invention.

Referring to FIG. 2, the radio resource may be defined as a two-dimensional domain of a time and a frequency.

The FFR method is a method of removing ICI by dividing a frequency domain and allocating a frequency resource to an adjacent cell in a radio resource structure that is defined as a two-dimensional domain of a time and a frequency, and the FTR method is technology that removes ICI by dividing a time domain and allocating a time resource to an adjacent cell.

In general, in the FFR method and the FTR method, because a configuration of an allocated resource is fixed, the FFR method and the FTR method are not applied to a change of intra-cell or inter-cell user distribution and traffic load distribution. Thereby, when inter-cell user load distribution and traffic load distribution are not uniform, a cell having insufficient resources exists, but a cell in which resources remain may exist. Further, when user distribution and traffic load distribution are not uniform even within one cell, allocated resources are not used or are insufficient and thus a case in which a service is not appropriately performed may occur. Therefore, a method of dynamically allocating a resource according to an intra-cell or inter-cell user distribution and traffic load distribution change is required.

Hereinafter, a method of dynamically allocating resources according to user distribution and traffic load distribution change according to an exemplary embodiment of the present invention will be described in detail based on an FTR method, and such a dynamic resource allocation method may be similarly applied to FFR.

Figure 3:
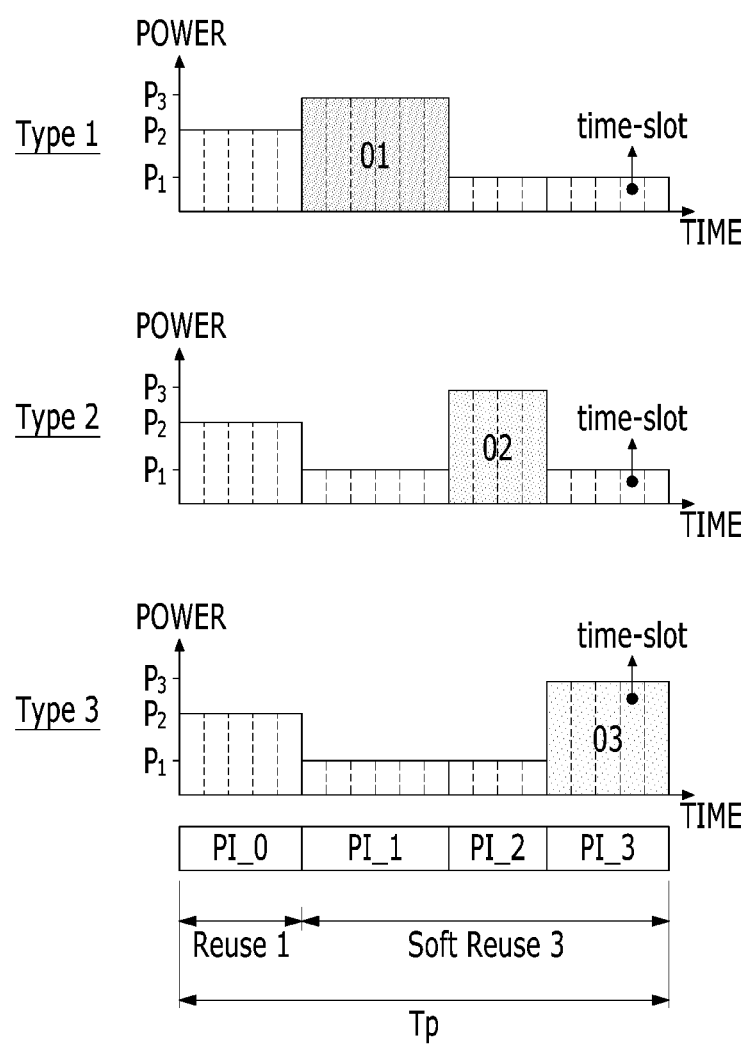
FIG. 3 is a diagram illustrating a method of allocating a dynamic resource according to an exemplary embodiment of the present invention.
Figure 4:
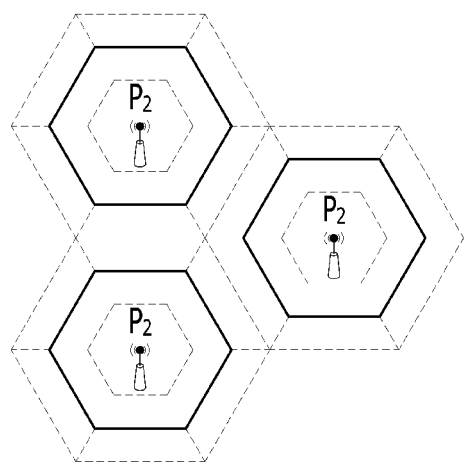
FIG. 4 is a diagram illustrating cell coverage according to transmitting power of FIG. 3.
Figure 4:
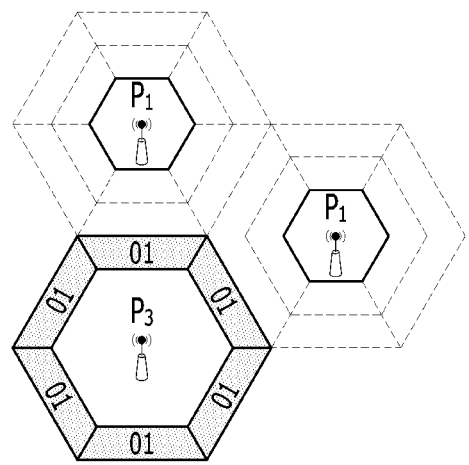
Figure 4:
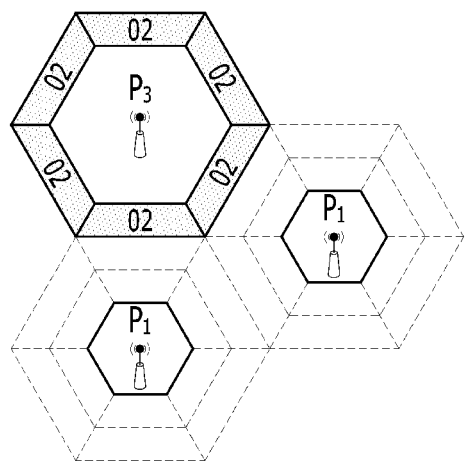
Figure 4:
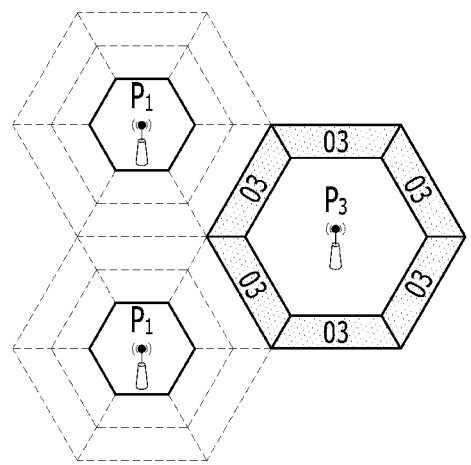

FIG. 3 is a diagram illustrating an example of a method of allocating a dynamic resource according to an exemplary embodiment of the present invention, and FIG. 4 is a diagram illustrating cell coverage according to transmitting power of FIG. 3.

Referring to FIG. 3, cells C1-C3 in a wireless communication system may be divided into a plurality of cells types, for example, three cell types type 1, type 2, and type 3. In this case, it is assumed that the cell C1 is type 1, the cell C2 is type 2, and the cell C3 is type 3.

A time frame of one cycle Tp is divided into a plurality of partitions. For example, when the cells C1-C3 in a wireless communication system are divided into three cell types type 1, type 2, and type 3, a time frame of one cycle Tp may be divided into four partitions PI_0, PI_1, PI_2, and PI_3, and the four partitions PI_0, PI_1, PI_2, and PI_3 are allocated to a user of the cells C1-C3. The four partitions PI_0, PI_1, PI_2, and PI_3 are determined according to a resource division ratio, and the resource division ratio is determined according to user distribution and a traffic load of the cells C1-C3. The partitions PI_0, PI_1, PI_2, and PI_3 each include a plurality of time slots. In this case, the partition PI_0 is operated with a resource reuse coefficient 1, and the partitions PI_1, PI_2, and PI_3 are operated with a soft FTR method, which is a resource reuse coefficient 3.

A hard FTR method does not allow transmission of other cells in each of the partitions PI_1, PI_2, and PI_3, but a soft FTR method allows transmission of high power to a cell that receives allocation of a corresponding partition in each of the partitions PI_1, PI_2, and PI_3 and allows transmission of lower power to other cells.

Referring to FIG. 4, as shown in (a) of FIG. 4, at the partition PI_0, a base station of an entire type may service a user terminal within a cell using transmitting power of a level $P_2$. As shown in (b) to (d) of FIG. 4, at a partition [PI_I I={1, 2, 3}], base stations corresponding to a type I may service a user terminal that is positioned at a cell boundary using transmitting power of a highest level $P_3$, and a base station that is not a type I may service a user terminal that is positioned in a cell central area using transmitting power of a level $P_1$.

A division ratio of partitions PI_0, PI_1, PI_2, and PI_3 for a cycle Tp is dynamically adjusted according to a network situation, i.e., user distribution and traffic load distribution, and has a relationship of Equation 1.

$$PI\_0 + PI\_1 + PI\_2 + PI\_3 = Tp \quad \text{(Equation 1)}$$

In this case, partitions PI_0, PI_1, PI_2, and PI_3 may be interleaved in a time axis under a condition satisfying Equation 1 in consideration of HARQ and a delay problem.

A SINR distribution of a cell changes at each time resource segment according to a type of cells C1-C3. Cell coverage at each partition may be defined according to a transmitting power level $P=\{P_1, P_2, P_3\}$ of each of the cells C1-C3. Therefore, $P_1$ may be set to cause interference of a threshold or less to a user terminal that is positioned at a cell boundary area Rout of an adjacent cell, and $P_2$ may be set to provide a SINR of a threshold value or more to a user terminal that is positioned at an intra-cell central area Rin, except for a cell boundary area Rout of a serving cell. $P_3$ may be set to provide a SINR of a threshold value or more to a user terminal that is positioned at a cell boundary area Rout of a serving cell. A ratio of transmitting power $P_1$, $P_2$, and $P_3$ on each base station basis is equally set, and an absolute magnitude thereof may be set in proportion to maximum transmitting power on each base station basis.

That is, the transmitting power level $P=\{P_1, P_2, P_3\}$ has a range of Equation 2.

$$0 \leq P_1 \leq P_2 \leq P_3 \leq P_{max} \quad \text{(Equation 2)}$$

In Equation 2, $P_{max}$ is maximum transmitting power that a base station can transmit.

$\mathcal{N}$ and $\mathcal{K}$ are referred to as a coordinated base station (BS) set and a user set, respectively. It is assumed that each user is connected to only one base station. $\mathcal{K}_n$ is referred to as a user set that is connected to a base station n.

A full buffer traffic model that considers best effort traffic and that has infinitely backlogged data packets for each user that is connected to a base station is assumed.

$\mathcal{L} = \{0, L\}$ is a set of partitions, and D is defined as a ratio of a partition PI_I (I=0, 1, 2, 3), i.e., a resource division ratio. In this case, $\Phi_l \geq 0$ and $\Sigma_{l \in \mathcal{L}} \phi_l = 1$. is defined as a vector of $\phi_l$. $\mathcal{N}_l$ is defined as a base station set that receives allocation of transmission of high power $P_3$ at a time slot t belonging to an l-th partition. For example, when a corresponding time slot t belongs to an l-th partition, the base station $n \in \mathcal{N}_l$ sets high transmitting power $P_3$, and when a corresponding time slot t does not belong to an l-th partition, the base station $n \in \mathcal{N}_l$ sets lower transmitting power $P_1$. At the partition PI_0, $\mathcal{N}_l$ includes all base stations and sets transmitting power $P_2$.

When $\mathcal{S} = \{1, \ldots \mathcal{S}\}$ is a set of a subchannel and a base station n is transmitting power for the partition PI_I, transmitting power $p_{s,l}^n$ at a subchannel $s \in \mathcal{S}$ is equally allocated to all subchannels with a value of $P_l^n/S$.

At a time slot t belonging to the partition PI_I, SINR $SINR_{k,s,l}^n(t)$ of a user k of the subchannel s of the base station n may be represented as in Equation 3.

$$SINR_{k,s,l}^n(t) = \frac{p_{s,l}^n G_{k,s}^n(t)}{\sigma_{k,s}^n + \sum_{j \in N, j \neq n} p_{s,l}^j G_{k,s}^j(t)} \quad \text{(Equation 3)}$$

Herein, $G_{k,s}^n(t)$ represents a channel gain at the subchannel s between the base station n and the user k, and $\sigma_{k,s}^n$ represents noise power of the subchannel s.

An achievable data rate $r_{k,s,l}^n(t)$ the user k for the subchannel s of the base station n according to Shannon's formula may be given as in Equation 4.

$$r_{k,s,l}^n(t) = \frac{B}{S} \log_2 (1 + \gamma SINR_{k,s,l}^n(t)) \quad \text{(Equation 4)}$$

Herein, B is a system bandwidth, and γ is a gap between SINR and capacity and is generally determined by a target bit error rate. The base station n may calculate an instantaneous achievable data rate, i.e., a user's achievable data rate, at every time slot t of all subchannels based on Equation 4 through channel state information feedback for connected users.

$I(t)=[I_{k,s,l}{}^{n}(t): n \in \mathcal{N}, k \in \mathcal{K}_n, s \in \mathcal{S}]$ is defined as a user scheduling indicator vector. For example, $I_{k,s,l}{}^{n}(t)=1$ represents a case in which the base station n allocates a connected user k to the time slot t at the subchannel, and in a case in which the base station n does not allocate a connected user k to the time slot t at the subchannel, $I_{k,s,l}{}^{n}(t)=0$.

Because only a maximum of one user may be scheduled for the subchannel s at the base station n at every time slot, the constraint of Equation 5 exists.

$$\sum_{k \in K_n} I_{k,s,l}^{n}(t) \leq 1, \forall n \in N, s \in S \quad \text{(Equation 5)}$$

Therefore, at the time slot t, an actual data rate of the user k of the partition PI_l may be represented by Equation 6.

$$R_{k,l}^{n}(t) = \sum_{s \in S} I_{k,s,l}^{n}(t) r_{k,s,l}^{n}(t) \quad \text{(Equation 6)}$$

In this case, because $\Phi$ determines a time slot t to which the partition PI_l belongs, time averaged throughput $\overline{R}_k{}^n$ to the time slot t is a function of $\Phi$ and may be represented with Equation 7.

$$\overline{R}_k^n(t; \Phi) = \frac{1}{t} \sum_{\tau=1}^{t} R_{k,l}^n(\tau) \quad \text{(Equation 7)}$$

An optimal inter-cell resource division ratio for maximizing long term network wide utility and an optimization problem for determining intra-cell user scheduling based on the above equations are defined by Equation 8.

$$\max_{\Phi, I} U(t) = \sum_{n \in N} \omega_n \sum_{k \in K_n} U_k^n(\overline{R}_k^n(t; \Phi)), \quad \text{(Equation 8)}$$

subject to $\sum_{l \in L} \phi_l = 1$, $\phi_l \geq 0, \forall l \in L$, $\sum_{k \in K_n} I_{k,s,l}^n(t) \leq 1, \forall n \in N, s \in S$ In this case, $U_n{}^k(\overline{R}_k{}^n)$ is a utility function, and $\omega_n$ is a weight factor that reflects a traffic load of the base station n. In an exemplary embodiment of the present invention, a generalized proportional fairness utility function was used as $U_k{}^n(\overline{R}_k{}^n)$, and $U_k{}^n(\overline{R}_k{}^n)$ is given as in Equation 9.

$$(\overline{R}_k^n) = \begin{cases} w_k \log \overline{R}_k^n, & \alpha = 1, \\ w_k (1-\alpha)^{-1} \overline{R}_k^{n\,1-\alpha}, & \alpha \geq 0 \text{ and } \alpha \neq 1 \end{cases} \quad \text{(Equation 9)}$$

Herein, $w_k \geq 0$ represents a priority order of the user k, and $\alpha$ is a fairness factor between users. When $\alpha$ is 0, a resource is allocated only to users having a good channel state, and as a value $\alpha$ increases, a resource may be uniformly distributed. The value $\alpha$ may be changed according to an operator's operation method.

In this case, in Equation 9, static soft FTR is a case in which $\Phi$ is simply fixed to $$\left[ 0, \frac{1}{L}, \cdots, \frac{1}{L} \right].$$

Equation 8, which is an optimization problem, is non-convex joint optimization, and is a non-deterministic polynomial-time hard (NP-time hard) problem.

In an exemplary embodiment of the present invention, in order to solve this problem, an optimization problem of Equation 8 is divided into two sub-problems, i.e., an intra-cell user scheduling sub-problem and an inter-cell resource division sub-problem. The intra-cell user scheduling sub-problem is a problem of maximizing U(t) by optimizing user scheduling I in a given resource division ratio $\Phi$. The inter-cell resource division sub-problem is a problem of maximizing U(t) by optimizing a resource division ratio $\Phi$ for given user scheduling I.

The base station n is independently opportunistic at every time slot, performs channel-aware intra-cell user scheduling, and in order to reduce intra-cell scheduling overhead and complexity, the base station n solves an inter-cell resource division problem through cooperation between base stations at every time frame of one cycle.

First, a method of solving an intra-cell user scheduling sub-problem will be described in detail.

For a given achievable resource division ratio $\Phi$, transmitting power $p_{s,l}{}^n$ is fixed. Therefore, when using a slope scheduling algorithm, an optimization problem of Equation 8 may be separated into an independent user scheduling sub-problem of N*S for the subchannel s of the base station n as in Equation 10.

$$\max_{I(t)} \sum_{k \in K_n} \nabla U_k^n(\overline{R}_k^n(t-1; \Phi)) I_{k,s,l}^n(t) r_{k,s,l}^n(t) \quad \text{(Equation 10)}$$

subject to $\sum_{k \in K_n} I_{k,s,l}^n(t) \leq 1$

Therefore, it may be optimal that user scheduling in the given base station n, the subchannel s, and the partition PI_l is determined as in Equation 11.

$$I_{k,s,l}^n(t) = \begin{cases} 1, & \text{if } k = \operatorname*{argmax}_{k \in K_n} \nabla U_k^n(\overline{R}_k^n(t-1; \Phi)) r_{k,s,l}^n(t) \\ 0, & \text{otherwise} \end{cases} \quad \text{(Equation 11)}$$

Equation 7 may be expressed with Equation 12 with a running average equation of $R_{k,l}{}^n(t)$.

$$\overline{R}_k^n(t; \Phi) = (1-\epsilon_t)\overline{R}_k^n(t-1; \Phi) + \epsilon_t R_{k,l}^n(t) \quad (10) \quad \text{(Equation 12)}$$

In this case, $\overline{R}_k{}^n(0; \Phi)=0$, and $\epsilon_t=1/t$.

In an exemplary embodiment of the present invention, in order to recognize the user's operation in a dynamic network environment, two statistic variables of an average data rate $\overline{R}_{k,l}{}^n(t)$ of the user k and average user scheduling $\overline{I}_{k,l}{}^n(t)$ of the base station n at each partition PI_l are defined as in Equations 13 and 14, respectively.

$$\overline{R}_{k,l}^n(t) = \begin{cases} (1-\varepsilon_t)\overline{R}_{k,l}^n(t-1) + \varepsilon_t R_{k,l}^n(t), & \text{if } R_{k,l}^n(t) \neq 0 \\ \overline{R}_{k,l}^n(t-1), & \text{otherwise} \end{cases} \quad \text{(Equation 13)}$$

$$\overline{I}_{k,l}^n(t) = (1-\varepsilon_t)\overline{I}_{k,l}^n(t-1) + \varepsilon_t I_{k,l}^n(t) \quad \text{(Equation 14)}$$

In this case, $I_{k,l}{}^n(t) = \min(1, \Sigma_{s \in S} I_{k,s,l}{}^n(t))$.

A probability in which a user $k \in \mathcal{K}_n$ is scheduled in a minimum one subchannel for the partition PI_l to the time slot t is defined as $\theta_{k,l}^n(t)$ based on measurement for a time frame. Thereafter, Equation 15 may be formed.

$$\bar{I}_{k,l}^n(t) = \theta_{k,l}^n(t)\phi_l \quad \text{(Equation 15)}$$

An average data rate of the user k may be expressed as in Equation 16.

$$\bar{R}_k^n(t;\Phi) = \sum_{l \in L} \bar{I}_{k,l}^n(t)\bar{R}_{k,l}^n(t) \quad \text{(Equation 16)}$$

By updating such a statistic variable, the base station n can further recognize a network environment and can thus be used for calculating optimal $\Phi$ for an inter-cell resource division sub-problem. A time frame of one cycle includes time slots of the T number, and in this case, it is assumed that T>>1. That is, a cycle of inter-cell resource division is much larger than one time slot. Before a time frame terminates, it is assumed that $\bar{R}_k^n(t;\Phi)$ converges at $\bar{R}_k^n(\Phi)$, and $\bar{R}_k^n(\Phi)$ is used for determining an optimal resource division ratio for a next time frame. Therefore, in the following description, at $\bar{R}_k^n(\Phi)$, $\bar{R}_{k,l}^n$, and $\bar{I}_{k,l}^n$, a time index t will be omitted.

Next, for given user scheduling, a method of solving an inter-cell resource division sub-problem will be described in detail.

For given user scheduling of each partition PI_I, an optimization problem of Equation 8 may be arranged with an inter-cell resource division problem as in Equation 17.

$$\max_{\Phi} \sum_{n \in N} \omega_n \sum_{k \in K_n} U_k^n(\bar{R}_k^n(\Phi)) \quad \text{(Equation 17)}$$

$$\text{subject to } \sum_{l \in L} \phi_l = 1$$

Because an object function of Equation 17 is obviously concave to $\Phi$, optimal $\Phi$ may be obtained by a Karush-Kuhn-Tucker (KKT) condition. Equation 18 is a Lagrangian function of Equation 17.

$$F(\Phi, \lambda) = \sum_{n \in N} \omega_n \sum_{k \in K_n} U_k^n(\bar{R}_k^n(\Phi)) + \lambda\left(1 - \sum_{l \in L} \phi_l\right) \quad \text{(Equation 18)}$$

In this case, $\lambda$ is a non-negative Lagrange multiplier. Optimal $\Phi$ and $\lambda$ should satisfy a condition of Equation 19 and Equation 20.

$$\sum_{n \in N} \omega_n \sum_{k \in K_n} \nabla U_k^n(\bar{R}_k^n(\Phi)) \theta_{k,l}^n \bar{R}_{k,l}^n - \lambda = 0 \quad \text{(Equation 19)}$$

$$1 - \sum_{l \in L} \phi_l = 0 \quad \text{(Equation 20)}$$

An optimal resource division ratio $\phi_l^*$ such as Equation 21 may be obtained by Equations 15 and 19.

$$\phi_l^* = \frac{1}{\lambda^*} \sum_{n \in N} \omega_n \sum_{k \in K_n} \nabla U_k^n(\bar{R}_k^n(\Phi)) \bar{I}_{k,l}^n \bar{R}_{k,l}^n \quad \text{(Equation 21)}$$

Here, $\lambda^*$ is determined from Equation 20 and is the same as that of Equation 22.

$$\lambda^* = \sum_{l \in L} \sum_{n \in N} \omega_n \sum_{k \in K_n} \nabla U_k^n(\bar{R}_k^n(\Phi)) \bar{I}_{k,l}^n \bar{R}_{k,l}^n \quad \text{(Equation 22)}$$

Therefore, an optimal resource division ratio $\phi_l$ for a next time frame may be calculated as in Equation 23 based on statistical variables that are obtained by a resource division ratio $\Phi$ of a previous time frame.

$$\phi_l^* = \frac{\sum_{n \in N} \omega_n \Delta \phi_l^n}{\sum_{l \in L} \sum_{n \in N} \omega_n \Delta \phi_l^n} \quad \text{(Equation 23)}$$

In this case, $\Delta \phi_l^n$ is the same as that of Equation 24.

$$\Delta \phi_l^n = \sum_{k \in K_n} \nabla U_k^n(\bar{R}_k^n(\Phi)) \bar{I}_{k,l}^n \bar{R}_{k,l}^n \quad \text{(Equation 24)}$$

In the base station n, $\Delta \phi_l^n$ is evaluated at an entire partition PI_I based on measurement for a previous time frame. In order to calculate $\phi_l^*$, the base station n periodically receives two statistical variables of $\omega_n$ and $\Delta \phi_l^n$ of each partition PI_I from another coordinated BS. In this case, $\omega_n$ is a traffic load, and $\Delta \phi_l^n$ is marginal utility of the partition PI_I according to user distribution. The base station n may share two statistical variables with an adjacent base station through an interface. This interface may correspond to an interface X2 in LTE. The base station n determines an optimal resource division ratio using $\omega_n$ and $\Delta \phi_l^n$.

Figure 5:
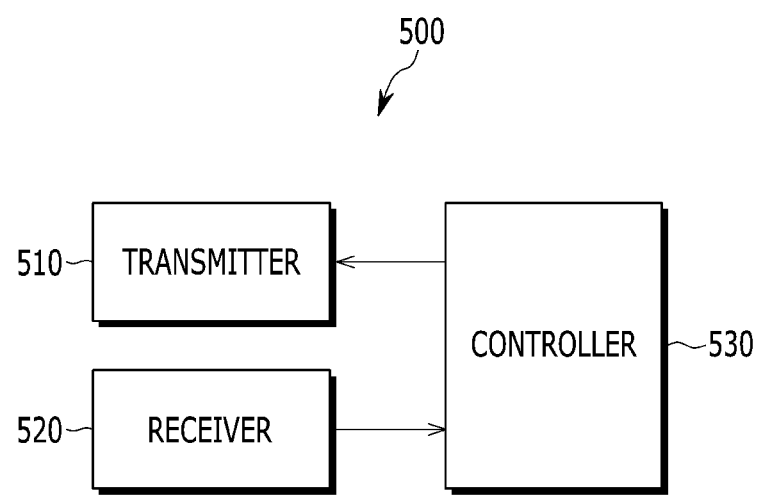
FIG. 5 is a block diagram illustrating a resource allocation apparatus of a base station according to an exemplary embodiment of the present invention.

FIG. 5 is a block diagram illustrating a resource allocation apparatus of a base station according to an exemplary embodiment of the present invention.

Referring to FIG. 5, a resource allocation apparatus 500 of the base station n includes a transmitter 510, a receiver 520, and a controller 530.

The transmitter 510 and the receiver 520 perform communication with an adjacent base station. The transmitter 510 transmits resource division information to a coordinated BS, and the receiver 520 receives resource division information from a coordinated BS. Here, the resource division information may include $\omega_n$ and $\Delta \phi_n^l$, as described above.

The controller 530 performs intra-cell user scheduling at every time slot and determines a resource division ratio through cooperation between base stations at every time frame. The controller 530 determines a resource division ratio of a next time frame using resource division information of an immediately preceding time frame. Further, the controller 530 allocates transmitting power to each partition and services transmitting power that is allocated to a partition to which a present time slot belongs to a user, as described in FIG. 3.

Figure 6:
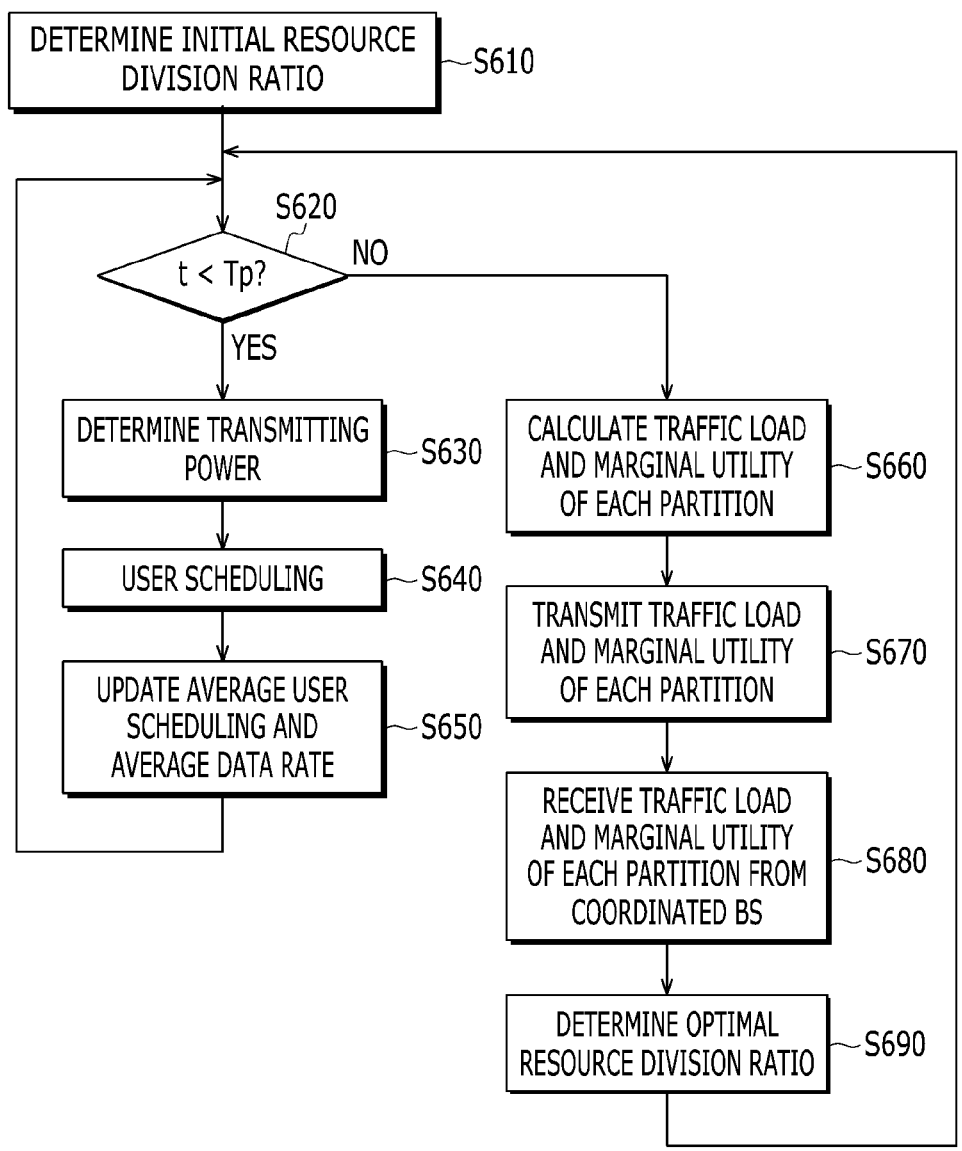
FIG. 6 is a flowchart illustrating a method of determining a resource division ratio in a controller according to an exemplary embodiment of the present invention.

FIG. 6 is a flowchart illustrating a method of determining a resource division ratio in a controller according to an exemplary embodiment of the present invention.

Referring to FIG. 6, the controller 530 determines an initial resource division ratio (S610). The initial resource division ratio may be determined to equally divide each partition at a time frame.

The controller 530 determines whether a present time slot t belongs within a time frame Tp of one cycle (S620), and if a present time slot t belongs within a time frame Tp of one cycle, the controller 530 determines the user's transmitting power at the present time slot t (S630). As described above, when the time slot t belongs to a partition PI_0, the controller 530 determines transmitting power to a level $P_2$, when a time slot t belongs to a partition [PI_I I={1, 2, 3}] and a base station is an I type base station, the controller 530 may determine transmitting power to a level $P_3$, and when a base station is not an I type base station, the controller 530 may determine transmitting power to a level $P_1$.

Next, the controller 530 performs user scheduling at the time slot t with a method of Equation 11 (S640). The controller 530 calculates average user scheduling as in Equation 15, calculates an average data rate of the user as in Equation 16, and performs user scheduling at each time slot using average user scheduling, the user's average data rate, and an achievable data rate of the user. As described above, the controller 530 can calculate an achievable data rate of the user in an entire subchannel through channel state information feedback from the user. The controller 530 can calculate the user' achievable data rate in LTE through, for example, CQI feedback.

The controller 530 performs user scheduling and updates average user scheduling and an average data rate of the user (S650), and uses the updated average data rate and the average data rate of the user for user scheduling at a next time slot.

In this way, the controller 530 performs user scheduling at every time slot, and if a time slot t does not belong to a time frame of one cycle at step S620, and the controller 530 calculates a traffic load that is obtained by a resource division ratio of a previous time frame and marginal utility of each partition (S660) and transmits the traffic load and marginal utility of each partition to a coordinated BS (S670). Further, the controller 530 receives a traffic load that is obtained by a resource division ratio of a previous time frame at a coordinated BS from another adjacent base station and marginal utility of each partition PI_I (S680).

The controller 530 determines an optimal resource division ratio for a next time frame as in Equation 23 using a traffic load of all base stations belonging to the coordinated BS and marginal utility of each partition PI_I (S690).

Meanwhile, a centralized server for controlling all base stations of the wireless communication system may perform inter-cell resource allocation. In this case, the above-described optimal resource division ratio determining method may be performed by the centralized controller.

Figure 7:
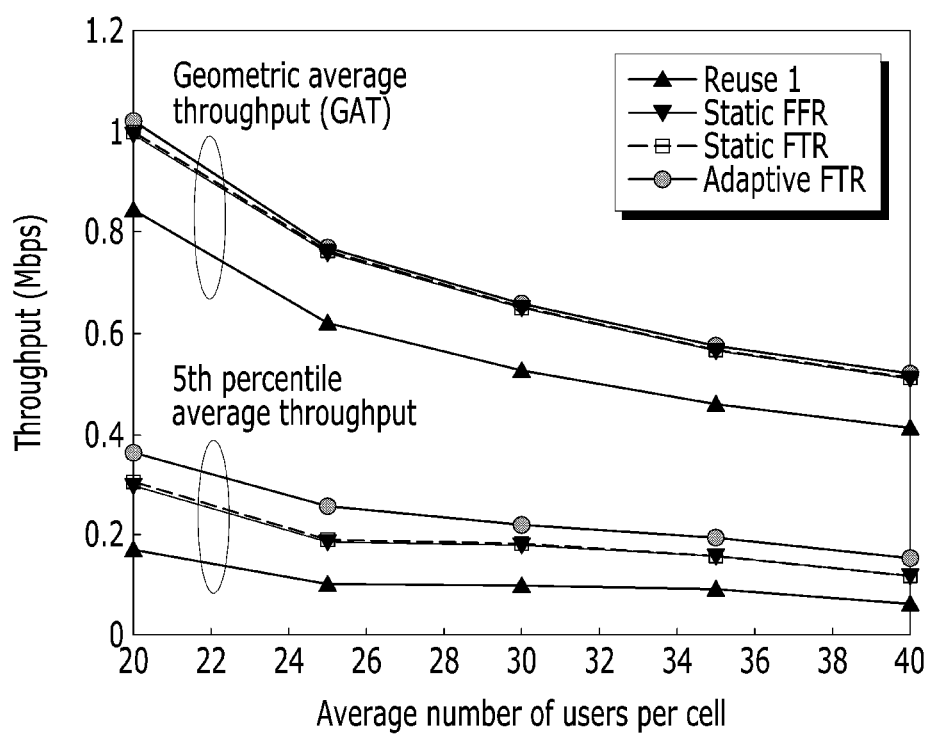
FIG. 7 is a graph comparing GAT and 5th percentile average throughput performance according to a change of an average number of users of a cell.
Figure 8:
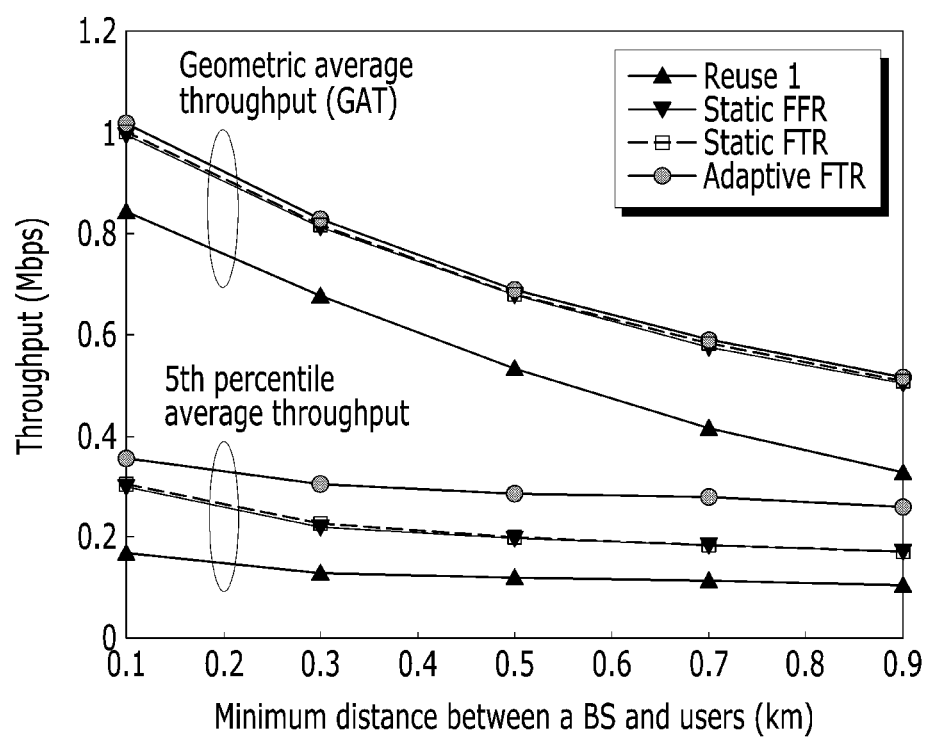
FIG. 8 is a graph comparing GAT and 5th percentile average throughput performance of various user distributions.

Performance of the above-described inter-cell resource division method according to an exemplary embodiment of the present invention was determined in a simulation environment of Table 1, and results thereof are illustrated in FIGS. 7 and 8.

TABLE 1

| Parameter | Assumption |
|---|---|
| Cell Layout | 19 hexagonal cells |
| Radius of cell coverage | 1000 meters |
| Number of sub-channels | 16 |
| Carrier frequency | 2.3 GHz |
| System bandwidth | 10 MHz |
| Thermal noise density | −174 dBm/H |
| Target bit error rate | 0.001 |
| Time-slot length | 1 ms |
| Maximum transmission power | 20 W |
| Power levels for each partition | 20 W, 20 W, and 2 W for reuse 1, primary of soft reuse 3 and other partitions |
| Propagation loss model | $PL(d_k) = 16.62 + 37.6 \log_{10}(d_k[m])[dB]$ |
| Channel Model | Jakes' Rayleigh fading model |

TABLE 1-continued

| Parameter | Assumption |
|---|---|
| User distribution | Uniformly distribution |
| Traffic load ratio for 3 center BSs | 8:2:1 |
| Utility function | $w_k \log \overline{R}_k^n$ and $w_k = 1$ |
| Time period T for inter-cell resource partitioning | 100 ms |
| Simulation time | 10,000 time-slots |
| Performance metrics | geometric average throughput $$GAT = \frac{1}{K} \sum_{n \in EN} \sum_{EK_n} \log \overline{R}_k^n$$ 5th percentile average throughput |

In Table 1, a 5th percentile average throughput used an average of throughput of lower 5% of users. A dynamic resource allocation method according to an exemplary embodiment of the present invention is referred to as adaptive FTR. For performance analysis, adaptive FTR was compared with a resource reuse coefficient 1 (reuse 1), static FFR, and static FTR methods. In an experiment, static FFR and static FTR each equally divided a resource in subchannels and time slot areas. Although adaptive FTR initially equally divided a resource in a time slot area, adaptive FTR generally converges at an optimal value in a cycle of 10-30 times according to a simulation environment while repeating inter-cell resource division and intra-cell user scheduling.

FIG. 7 is a graph comparing GAT and 5th percentile average throughput performance according to a change of an average number of users of a cell.

Referring to FIG. 7, adaptive FTR according to an exemplary embodiment of the present invention represents excellent performance, compared with other methods from the 5th percentile average throughput viewpoint while maintaining optimal performance from a geometric average throughput (GAT) viewpoint. Particularly, it can be seen that adaptive FTR shows high performance improvement of 110-150% from a 5th percentile average throughput viewpoint against reuse 1.

FIG. 8 is a graph comparing GAT and a 5th percentile average throughput performance of various user distributions, and while changing a minimum distance between a BS and the user from 0.1 to 0.9 km, a 5th percentile average throughput and GAT of user distribution were measured.

Referring to FIG. 8, as a minimum distance between the BS and users increases, it can be seen that GAT and 5th percentile average throughput decrease in an entire technique. However, a performance gain of adaptive FTR that is compared with other techniques increases. Particularly, compared with reuse 1, a performance gain of adaptive FTR increases by 20-57% from a GAT viewpoint and increases by 110-150% from a 5th percentile average throughput viewpoint. Further, compared with static FFR and static FTR, it can be seen that a performance gain of 17-53% is achieved from a 5th percentile average throughput viewpoint. As adaptive FTR improves a 5th percentile average throughput, it can be seen that fairness is improved, as shown in Table 2. Such a performance gain is obtained by adjusting a resource division ratio adaptively and optimally, as a traffic load and user distribution change. Table 2 represents fairness performance of various user distributions.

TABLE 2

| distance (km) | Reuse 1 | Static FFR | Static FTR | Adaptive FTR |
|---|---|---|---|---|
| 0.3 | 0.669 | 0.714 | 0.718 | 0.727 |
| 0.5 | 0.699 | 0.754 | 0.756 | 0.773 |
| 0.7 | 0.706 | 0.766 | 0.769 | 0.806 |

According to an exemplary embodiment of the present invention, by adaptively and optimally dividing an inter-cell resource using traffic load information of each base station and marginal utility information of each resource partition, while maintaining performance of an entire network, a cell boundary user's performance can be remarkably improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating a resource in a resource allocation apparatus of a base station of a cellular communication system comprising a plurality of cells, the method comprising:
  determining a resource division ratio for dividing a present resource frame of a time domain in a time axis using a traffic load of a plurality of cells that are measured for an immediately preceding resource frame and marginal utility of each partition of the immediately preceding resource frame of the plurality of cells, obtained through cooperation between base stations;
  dividing the present resource frame of the time domain into a plurality of partitions in a time axis -according to the resource division ratio; and
  allocating the plurality of partitions to users of a cell that the base station manages.

2. The method of claim 1, further comprising performing intra-cell user scheduling at every time slot at each of the plurality of partitions.

3. The method of claim 1, wherein the determining of a resource division ratio comprises:
  calculating marginal utility of each partition using an average data rate of each user for the immediately preceding resource frame;
  calculating a traffic load at the base station for the immediately preceding resource frame; and
  transmitting the traffic load that is calculated for the immediately preceding resource frame and marginal utility of the each partition to a coordinated base station (BS) of an adjacent cell.

4. The method of claim 3, wherein the determining of a resource division ratio further comprises receiving a traffic load that is calculated for the immediately preceding resource frame from the coordinated BS of the adjacent cell and marginal utility of each partition.

5. The method of claim 1, wherein the plurality of partitions are divided into a first partition and a plurality of second partitions, and
  the allocating the plurality of partitions to a user comprises
  allocating the first partition to a user that is positioned at the center of the cell, and
  allocating one second partition of the plurality of second partitions to a user that is positioned at a boundary of the cell.

6. The method of claim 5, wherein the allocating of one second partition comprises setting transmitting power at the one second partition to a first level, and
  the allocating of the first partition comprises setting transmitting power at the first partition to a second level lower than the first level.

7. The method of claim 6, wherein the allocating the plurality of partitions to a user further comprises allocating the remaining second partitions of the plurality of second partitions to a user that is positioned at a center of the cell.

8. The method of claim 7, wherein the allocating of the remaining second partitions comprises setting transmitting power at the remaining second partitions to a third level lower than the second level.

9. A method of allocating a resource in a resource allocation apparatus of a base station of a cellular communication system comprising a plurality of cells, the method comprising:
  determining a resource division ratio of a present resource frame using a traffic load of a plurality of cells that are measured for an immediately preceding resource frame and marginal utility of each partition;
  dividing the present resource frame into a plurality of partitions according to the resource division ratio;
  allocating the plurality of partitions to a user of a cell that the base station manages; and
  performing intra-cell user scheduling at every time slot at each of the plurality of partitions;
  wherein the performing of intra-cell user scheduling comprises determining a user to allocate to the present time slot using an average data rate of each user at an immediately preceding time slot and an achievable data rate of each user for a subchannel of the base station at a present time slot.

10. The method of claim 9, wherein the determining of a user comprises calculating each user's average data rate at the immediately preceding time slot using each user's average scheduling indicator at the immediately preceding time slot, and a user that is allocated to the immediately preceding time slot has 1 as the average scheduling indicator and a user that is not allocated to the immediately preceding time slot has 0 as the average scheduling indicator.

11. A resource allocation apparatus of a base station that manages a first cell in a cellular communication system comprising a plurality of cells, the resource allocation apparatus comprising:
  a receiving unit that receives resource division information according to a resource division ratio of an immediately preceding resource frame from adjacent cells;
  a controller that determines a resource division ratio of a present resource frame for dividing the present resource frame of a time domain in a time axis using resource division information according to the resource division ratio of the immediately preceding resource frame of the plurality of cells, that divides the present resource frame of the time domain into a plurality of partitions in the time axis according to the determined resource division ratio, and that performs intra-cell user scheduling at every time slot at the plurality of partitions; and
  a transmitter that transmits resource division information according to a resource division ratio of the immediately preceding resource frame and the present resource frame to the adjacent cells,
  wherein the resource division information comprises a traffic load that is measured for an immediately preceding resource frame and marginal utility of each partition of the immediately preceding resource frame.

12. The resource allocation apparatus of claim 11, wherein the controller calculates marginal utility and a traffic load of each partition using an average data rate of each user for the immediately preceding resource frame.

13. The resource allocation apparatus of claim 11, wherein the controller determines a user to allocate to the present time slot using an average data rate of each user at an immediately preceding time slot and an achievable data rate of each user of a subchannel of the base station at a present time slot.

14. The resource allocation apparatus of claim 13, wherein the controller calculates an average data rate of each user at the immediately preceding time slot using an average scheduling indicator of each user at the immediately preceding time slot, and an average scheduling indicator of each user is 1 for a user that is allocated to the immediately preceding time slot and is 0 for a user that is not allocated to the immediately preceding time slot.

15. The resource allocation apparatus of claim 11, wherein the controller divides the plurality of partitions into a first partition and a plurality of second partitions according to a resource division ratio of the present resource frame, the plurality of second partitions are allocated to a user that is positioned at a boundary of a plurality of cells according to a cell type, and the first partition is allocated to a user that is positioned at the center of the plurality of cells.

16. The resource allocation apparatus of claim 15, wherein the controller sets transmitting power at an allocated second partition to a first level and sets transmitting power at the first partition to a second level lower than the first level.

17. The resource allocation apparatus of claim 15, wherein the remaining second partitions, except for an allocated second partition at a plurality of second partitions, are allocated to a user that is positioned at the center of the first cell, and the controller sets transmitting power at the remaining second partitions to a third level lower than the second level.

* * * * *